(12) United States Patent
Lum et al.

(10) Patent No.: US 7,808,779 B2
(45) Date of Patent: Oct. 5, 2010

(54) ROTATABLE DOCK FOR PORTABLE ELECTRONIC DEVICES

(75) Inventors: Myk Lum, Irvine, CA (US); Matthew Tivnon, Ladera Ranch, CA (US)

(73) Assignee: LDA, LLC, Irvine, CA (US)

( * ) Notice: Subject to any disclaimer, the term of this patent is extended or adjusted under 35 U.S.C. 154(b) by 129 days.

(21) Appl. No.: 12/325,764

(22) Filed: Dec. 1, 2008

(65) Prior Publication Data
US 2010/0134984 A1    Jun. 3, 2010

(51) Int. Cl.
*G06F 1/16* (2006.01)
(52) U.S. Cl. .............. 361/679.43; 348/373; 726/35; 439/55; 312/333; 16/327
(58) Field of Classification Search ............ 348/61, 348/373; 439/55, 296, 352, 164, 159; 726/35; 320/114; 710/303, 304, 323; 312/223.2, 312/333, 209; 16/438, 367, 327; 361/679.09, 361/679.17, 679.29, 679.27, 679.39, 679.43, 361/679.41, 679.55, 679.57, 725
See application file for complete search history.

(56) References Cited

U.S. PATENT DOCUMENTS

| 6,396,687 B1 * | 5/2002 | Sun et al. ............ 361/679.43 |
| 6,648,652 B2 * | 11/2003 | Nakano et al. ............ 439/55 |
| 6,856,506 B2 | 2/2005 | Doherty et al. |
| 7,352,567 B2 | 4/2008 | Hotelling et al. |
| 2006/0098116 A1 * | 5/2006 | Manico et al. ............ 348/373 |
| 2008/0229434 A1 * | 9/2008 | Upton ............ 726/35 |
| 2010/0118485 A1 * | 5/2010 | Crooijmans et al. .... 361/679.43 |

* cited by examiner

*Primary Examiner*—Hung V Duong
(74) *Attorney, Agent, or Firm*—Stetina Brunda Garred & Brucker

(57) ABSTRACT

A docking system for supporting a portable electronic device with a vertical operational orientation and a horizontal operational orientation is disclosed. The docking system includes a base stand unit that has a flat top surface. Additionally, there is a device support platform that is rotatably mounted to the base stand unit. The device support platform defines a cradle portion that is engageable to the portable electronic device. The device support platform has a first position corresponding to the vertical operational orientation, and a second position corresponding to the horizontal operational orientation.

27 Claims, 5 Drawing Sheets

ROTATABLE DOCK FOR PORTABLE ELECTRONIC DEVICES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to docking systems for portable electronic devices, in particular, for those devices with multiple operational orientations.

2. Related Art

A wide variety of portable electronic devices are used for entertainment, business, and general communication purposes. These include dedicated music players, combination media players (which play back music, movies, and static pictures), digital cameras, and cellular phones, among many others. All-in-one devices such as portable digital assistants (PDAs) and smart phones that combine multiple features of voice calling, e-mailing, web browsing, gaming, and so forth, are also popular. Generally, portable devices are designed with the intention of being taken with the owner for use in any location at any time.

Having limitations with respect to battery power, connectivity speed, and memory, however, portable electronic devices are typically peripheral to a primary general-purpose computer system. Conventional portable electronic devices use rechargeable batteries that can be charged through the device itself. In order to ensure sustained portable use, the batteries, and hence the device, must be periodically connected to a power source such as a powered Universal Serial Bus (USB) port on the computer, or a separate power adapter. Furthermore, music, movie, and picture files to be played back on the portable electronic devices are typically managed and stored on the general-purpose computer, and loaded through the aforementioned USB connection. Data generated on the device such as captured images, video, voice recordings, notes, and the like are likewise transferred out to the general-purpose computer via the USB connection.

For recharging and interconnection purposes, cables are typically utilized. In some cases, the power cable may be separate from the data cables, though because powered buses such as USB are widely available, only one cable/interface is necessary. Sometimes the portable device may have a non-standard adapter, in which case one end of the cable has a connector that properly mates thereto and the other end of the cable has a standard USB connector. So that its utility is not diminished in case the specialized cable is not available, many portable electronic devices instead have standardized adapters such as mini-USB.

Alternatively, docking stations or cradles are used with portable electronic devices. In addition to the data connectivity and power functions, docking stations provide a more attractive and convenient stationary storage function. For media playback, the docking station can connect to television screens and audio systems via one interface. Furthermore, unlike cables that require the manual interconnection of the connector to the adapter, docking stations may merely require placement of the portable electronic device therein, as typical configurations retain a bottom portion of the portable electronic device. Side connection systems are also known in the art, which function similarly to the vertically inserted configurations.

Docking stations are also suitable for desktop use, i.e., holding and positioning the portable electronic device during normal usage. For example, multi-purpose media players such as the iPod family of devices from Apple, Inc. of Cupertino, Calif. may be connected to docking stations to playback movies, music, and the like on the device itself without connecting to external screens and stereo systems. This is a particularly attractive function with devices such as the iPod Touch or the iPhone that have large displays.

Along these lines, the iPod Touch and the iPhone include accelerometers that are capable of detecting the physical orientation of the device for displaying content differently. For example, the landscape orientation may be appropriate for displaying wide-format video, while the portrait orientation may be more appropriate for documents, web pages, and the like. Even within a single type of functionality such as music playback, different application interfaces may be presented in one orientation or the other.

Accordingly, there is a need in the art for an improved rotatable dock for portable electronic devices.

BRIEF SUMMARY

A portable device docking system is contemplated in accordance with one embodiment of the present invention. The docking system may include an elongate base with a flat top end that defines an access slot. The base may be defined by a lateral axis and a longitudinal axis perpendicular thereto. The docking system may also include a device support arm rotatably mounted to the elongate base along the longitudinal axis thereof. The device support arm may have a first position and a second position. The device support arm may be defined by a first arm segment substantially concealing the access slot when in the first position.

Another embodiment of a portable device docking system is contemplated in accordance with the present invention. The docking system may include an elongate base defined by an open top end with a lateral axis and a longitudinal axis perpendicular thereto. Additionally, the docking system may include a tilting platform rotatably mounted to the elongate base along the lateral axis thereof. The tilting platform may define an access slot. The docking system may also include a device support arm that is rotatably mounted to the tilting platform along the longitudinal axis thereof, and may have a first position and a second position. The device support arm may be defined by a first arm segment that substantially conceals the access slot in the first position.

Another embodiment of the present invention contemplates a docking system for supporting a portable electronic device. Such a portable electronic device may have a vertical operational orientation and a horizontal operational orientation. The docking system may include a base stand unit that has a flat top surface. Additionally, the docking system according to this embodiment may include a device support platform that is rotatably mounted to the base stand unit. The device support platform may define a cradle portion that is engageable to the portable electronic device. Furthermore, the device support platform may have a first position corresponding to the vertical operational orientation, and a second position corresponding to the horizontal operational orientation. The docking system may also include a lateral support component extending from the device support platform.

A docking system is disclosed in accordance with another aspect of the present invention. This docking system may include a base housing compartment that is defined by an open top portion. There may also be a tilt panel that is rotatably mounted to the open top end of the base housing compartment along a first axis. The tilt panel may also define a first side section and an opposed second side section, where the first side section may define an access slot. The docking system may also include an arm receiver cup mounted to the tilt panel and extending into the base housing compartment. The arm receiver cup may have an open rectangular top defined by opposed long edges, opposed short edges, and a lip engageable to the access slot of the tilt panel. The docking system according to this embodiment may also include a dock arm that is rotatably mounted to the arm receiver cup. The dock arm may include a first panel defining a universal recess and a second panel that is perpendicular thereto. The panels may each have dimensions that are substantially equivalent to the open rectangular top of the arm receiver cup. An interchangeable device support defined by a universal bottom side and a device-specific top side may also be included in the docking system. The universal bottom side may be removably coupled to the universal recess of the dock arm.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions of the invention in connection with the illustrated embodiment. It is to be understood, however, that the same or equivalent functions and may be accomplished by different embodiments that are also intended to be encompassed within the scope of the invention. It is further understood that the use of relational terms such as first and second, top and bottom, left and right, and the like are used solely to distinguish one from another entity without necessarily requiring or implying any actual such relationship or order between such entities.

Figure 1A:
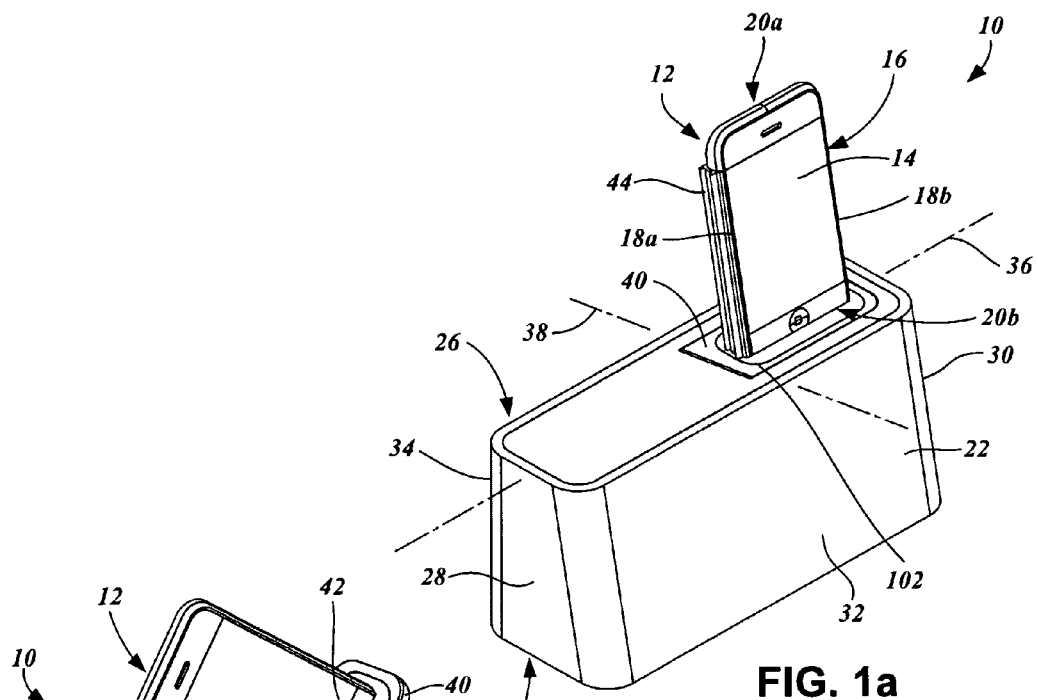
FIG. 1a is a perspective view of a docking system according to one embodiment of the present invention with a portable electronic device in a vertical orientation.
Figure 1B:
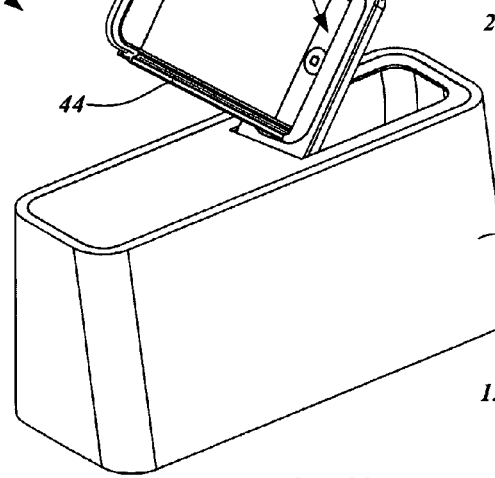
FIG. 1b is a perspective view of the docking system with the portable electronic device in an intermediate transitory orientation.
Figure 1C:
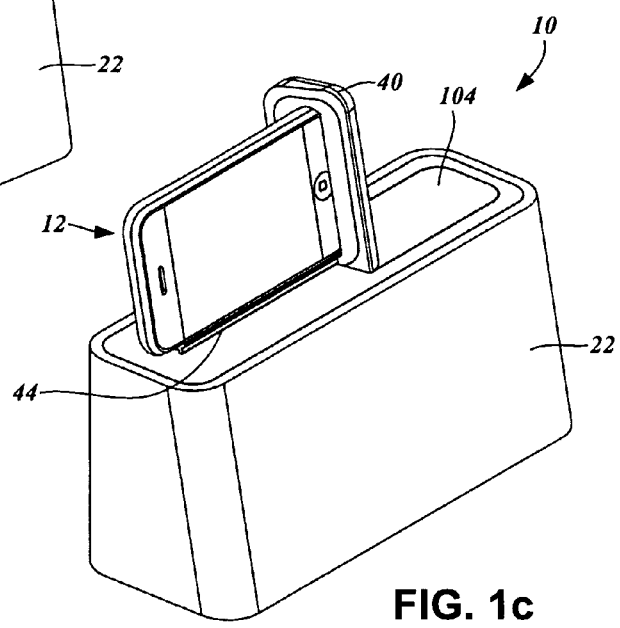
FIG. 1c is a perspective view of the docking system with the portable electronic device in a horizontal orientation.

With reference to FIGS. 1a-1c, a docking system 10 in accordance with one embodiment of the present invention holds and supports a portable electronic device 12. By way of example only and not of limitation, the portable electronic device 12 may be a multimedia player with a display 14 that substantially encompasses the entirety of a front face 16. The body of the portable electronic device 12 is generally of a rectangular configuration with opposed left and right vertical sides 18a and 18b, respectively, and opposed top and bottom horizontal sides 20a and 20b, respectively. The horizontal sides 20 are understood to extend perpendicularly relative to the vertical sides 18, with the vertical sides 18 being longer than the horizontal sides 18. The display 14 has similar vertical and horizontal aspect ratios as that of the overall portable electronic device 12.

It will be appreciated that the docking system 10 can accommodate any variation of the portable electronic device 12 and is not limited to the aforementioned multimedia player. Any other type of device with any other type of configuration may be readily substituted, though the illustrated example may most closely resemble the iPod Touch or iPhone from Apple, Inc. In this regard, the portable electronic device 12 is understood to include an accelerometer that detects its orientation, and adjusts the output to the display 14 accordingly. The portable electronic device 12 has a vertical operational orientation in which elements of the user interface are particularly arranged therefor, as well as a horizontal operational orientation in which the user interface is correspondingly re-arranged. Specifically the orientation shown in FIG. 1a where the vertical sides 18 extend up and down into the docking system 10 while the horizontal sides 20 extend left and right in a parallel relation to the same will be referenced herein as the vertical orientation. Relatedly, the orientation shown in FIG. 1c where the vertical sides 18 extend left and right and the horizontal sides 20 extend up and down, will be referenced herein as the horizontal orientation.

The docking system 10 includes an elongate base stand unit 22 with a flat bottom end 24 and an opposed flat top end 26. One embodiment of the elongate base stand unit 22 contemplates a prism configuration having a left face 28, a right face 30, a front face 32, and a back face 34. Additionally, the flat top end 26 is understood to be angled slightly forward so that the portable electronic device 12 is docked vertically. In this regard, the back face 34 extends higher than the front face 32, and the left and right faces 28, 30 have are tapered at the top. The corners of the respective faces are rounded according to this embodiment.

It will be appreciated by those having ordinary skill in the art that the above-described configuration of the elongate base stand unit is presented by way of example only and certain features are configured as such for aesthetic reasons. Any other appropriate configuration may be readily substituted without departing from the scope of the present invention, particularly for those elements that serve ornamental purposes. Along these lines, it I expressly contemplated that the elongate base stand unit 22 is part of or integrated into a primary unit such as a stereo receiver system, a loudspeaker box, a furniture, or other like component. That is, the base stand unit 22 is integrated into such devices, and the optional tilting platform 46 may be correspondingly mounted thereto.

The elongate base stand unit 22 has a lateral axis 36 extending through the center of the left face 28 and the right face 30, in a parallel relation to the front and back faces 32, 34. Along these lines, the elongate base stand unit 22 also has a longitudinal axis 38 extending through the front face 32 and the back face 34. The lateral axis 36 is understood to be perpendicular to the longitudinal axis 38.

As best illustrated in FIGS. 1b and 1c, the elongate base stand unit 22 includes a device support platform 40 that is rotatably mounted thereto. More particularly, the device support platform 40 is mounted along the longitudinal axis 38, that is, the device support platform 40 rotates about the longitudinal axis 38. The portable electronic device 12 is mounted or otherwise attached to the device support platform 40, and also rotates about the longitudinal axis 38. As will be discussed in further detail below, the device support platform 40 includes a cradle unit 42 that engages with the bottom end of the portable electronic device 12.

It is expressly contemplated that the device support platform 40 includes a connector that interfaces with an adapter on the bottom of the portable electronic device 12 for its requisite charging and data transfer functions. In this regard, the connector may support the mechanical linkage between the portable electronic device 12 and the device support platform 40. It is further contemplated that such a connector is linked to power sources and general purposes computers via one or more cables. Though not specifically depicted in the drawings, one of ordinary skill in the art will be readily able to ascertain such implementation particularities.

Generally, the device support platform 40 has a first position in which the attached portable electronic device 12 is in the vertical orientation as shown in FIG. 1a, and a second position in which the attached portable electronic device 12 is in the horizontal orientation as shown in FIG. 1c. Between the first position and the second position, there is an intermediate, transitory position as best illustrated in FIG. 1b. In the first position, the device support platform 40 is coplanar with the flat top end 26 and further clockwise movement thereof is limited. In the second position, the device support platform 40 is perpendicular to the flat top end 26, and further counterclockwise movement is limited. As shown in FIGS. 1a, 1b, and 1c, the docking system 10 thus permits the portable electronic device 12 to be attached thereto while being rotatable between the vertical orientation (first position) and the horizontal orientation (second position).

According to one embodiment of the present invention, a first embodiment of a lateral support component 44 extends from the device support platform 40 in a generally perpendicular relationship thereto. With the device support platform 40 in the first position, it is understood that the portable electronic device 12 is free-standing in that the lateral support component 44 does not further support the portable electronic device 12 to maintain its vertical orientation. However, with the device support platform in the intermediate or second position as shown in FIGS. 1b and 1c, the portable electronic device 12 rests against the lateral support component 44 and disengagement from the cradle unit 42 is prevented. Further structural details of the lateral support component 44 will be discussed below.

Figure 2A:
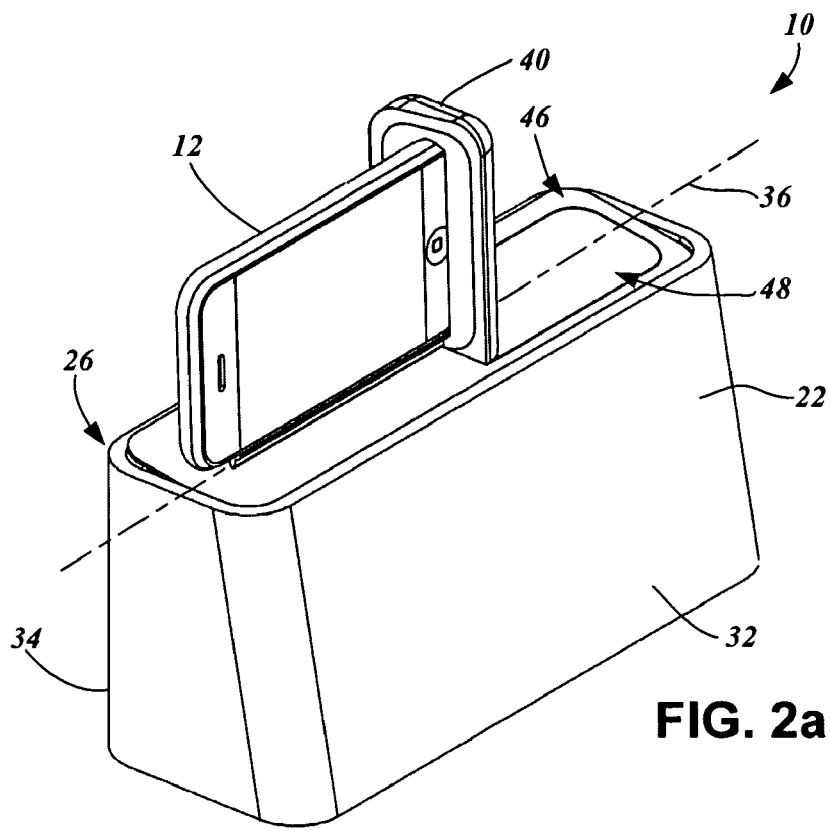
FIG. 2a is a perspective view of the docking system showing a tilting platform rotated to a first extreme position in accordance with an embodiment of the present invention.
Figure 2B:
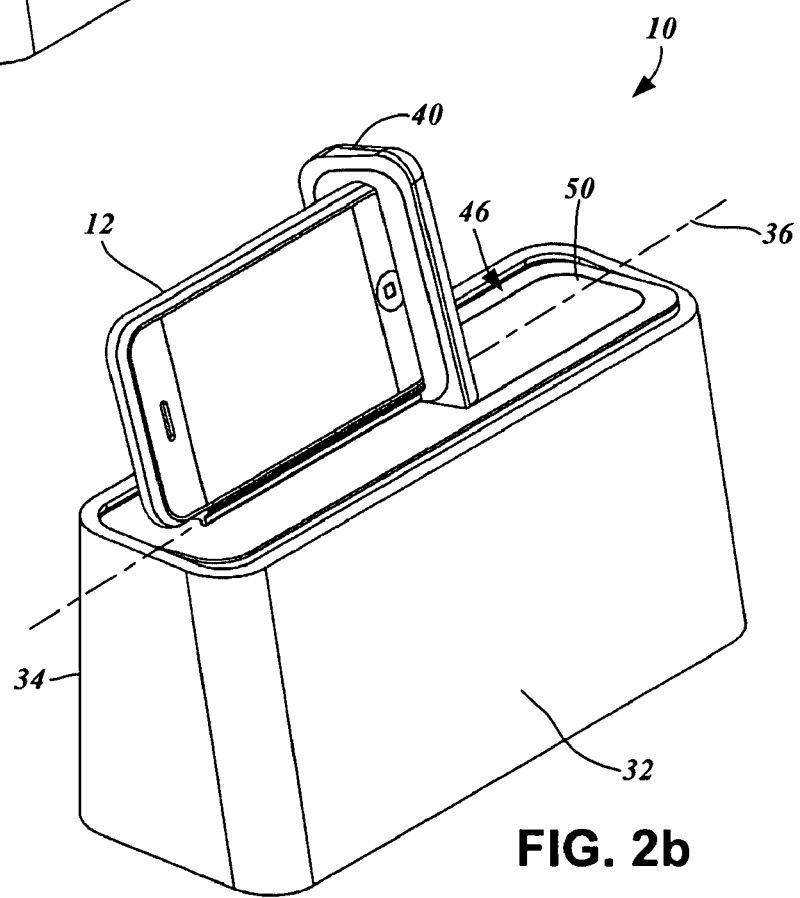
FIG. 2b is a perspective view of the docking system with the tilting platform rotated to a second extreme position.

With reference to FIGS. 2a and 2b, another embodiment of the present invention contemplates a tilting platform 46 that is rotatably mounted to the top end 26 of the base stand unit 22 along its lateral axis 36. The top end 26 is understood to be open, and some embodiments contemplate the base stand unit 22 being hollow. By being open, the tilting platform 46 may freely rotate within the base stand unit 22, subject to the limits of the front and rear faces 32, 34, thereof. In order to accommodate greater tilting angles, the faces of the base stand unit 22 may be angled outwards.

Because the device support platform 40 is linked to the tilting platform 46, it is understood that when the tilting platform 46 is rotated, so is the device support platform 40 and the portable electronic device 12. Thus, the viewing angle of the portable electronic device 12 may be adjusted. FIG. 2a illustrates the tilting platform 46 rotated in a forward direction, that is, a front half 48 dips into the base stand unit 22, and the portable electronic device 12 is tilted downward. FIG. 2b illustrates the tilting platform 46 rotated in a rearward direction, where a back half 50 dips into the base stand unit 22 and the portable electronic device 22 is tilted upward. It will be appreciated that in some circumstances, the tilting platform 46 may be optional, that is, instead of the tilting platform 46 being rotatably mounted to the base stand unit 22, the base stand unit 22 defines a flat top.

Figure 3:
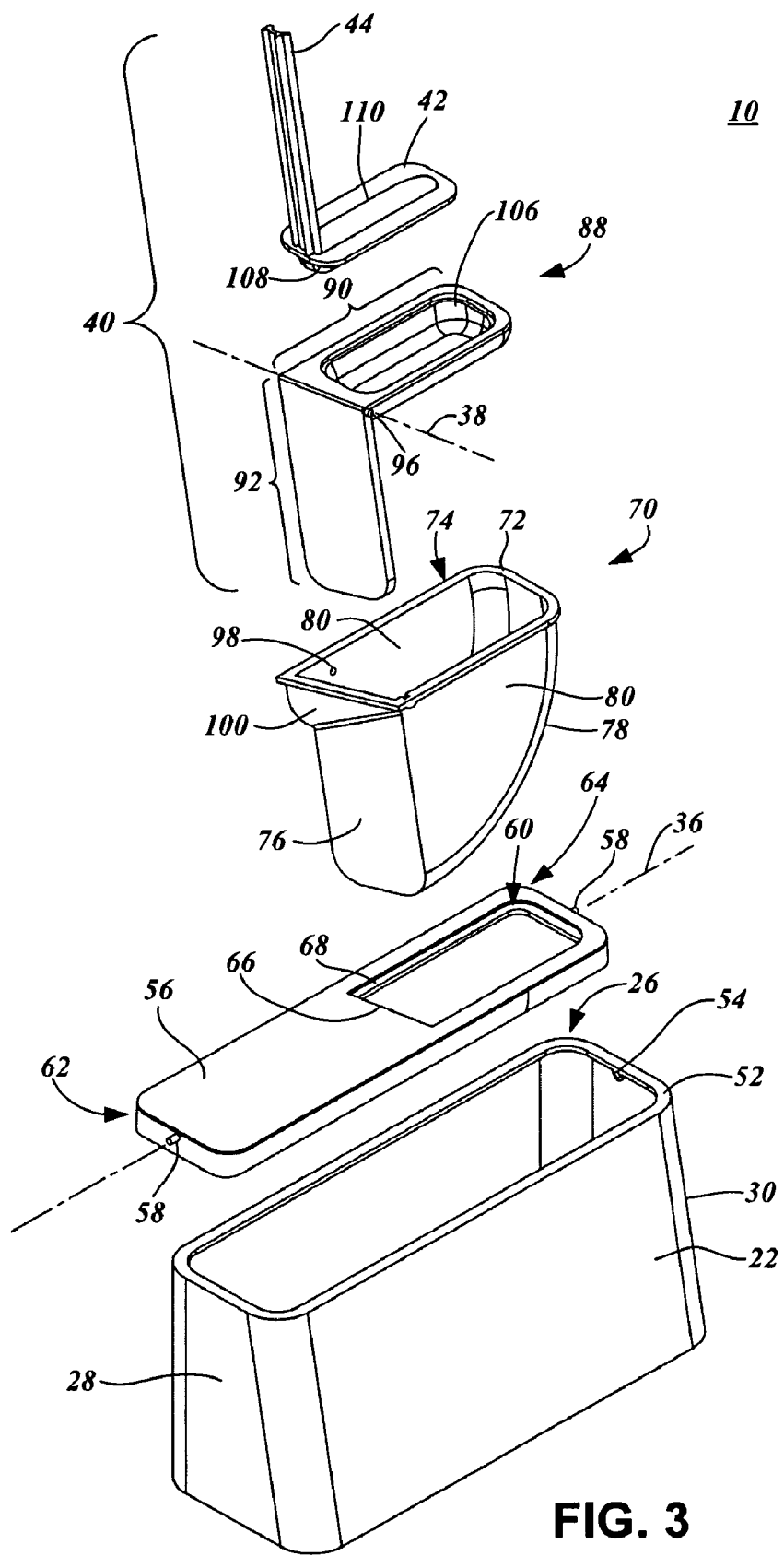
FIG. 3 is an exploded perspective view of the docking system in accordance with one embodiment of the present invention.

Having considered the basic functionality of the docking system 10, additional features of the various contemplated embodiments will be described in relation to such functionality, and the exploded perspective view of FIG. 3 illustrates those features in greater detail. As indicated above, the docking system 10 includes the base stand unit 22. According to one embodiment, the base stand unit 22 is defined by the open top end 26, and is understood to be hollow. The open top end 26 defines a flattened lip 52 that defines the outline of the open top end 26. Furthermore, opposed sides 28, 30 of the base stand unit 22 include a mounting hole 54 that is coaxial with the lateral axis 36.

The tilting platform 46 has a flat top surface 56 with a shape that matches the outline of the open top end 26 of the base stand unit 22. With additional reference to the cross-sectional view of FIG. 4a, in order for the tilting platform 46 to be mounted to the base stand unit 22, the opposed sides thereof each include a mounting pin 58 that is likewise coaxial with the lateral axis 36. Thus, the mounting pins 58 are inserted into the mounting hole 54 and are configured to rotate within the same. In this regard, the mounting pins 58 are cylindrical to mate with the cylindrical outline of the mounting holes 54. The depth from the flat top surface 56 to the center of the mounting pins 58 is understood to be equivalent as the depth from the flattened lip 52 to the center of the mounting hole 54, such that the flat top surface 56 is coplanar with the flattened lip 52. Although a particular rotatable mounting configuration has been described, those having ordinary skill in the art will recognize that other well-known configurations may be substituted. For example, the mounting holes 54 may have an open top, such that the mounting pins 58 can be readily inserted and removed therefrom.

It is envisioned that in some embodiments, the device platform 40 by default receives the portable electronic device 12 in a tilted orientation, that is, the device platform 40 has an offset receiving angle. In these embodiments, the lateral support component 44 is understood to extend from the device support platform at the same angle. Those having ordinary skill in the art will recognize that docking systems are typically placed below instead of above the user's eye level, thus there is an inherent necessity to angle the display upwards. As indicated above, however, the angle of the device platform 40 may be offset by the opposing angle of the tilting platform 46 such that the portable electronic device 12 effectively attaches vertically.

Referring again to the exploded perspective view of FIG. 3, the tilting platform 46 further defines an access port or slot 60 through which the device support platform 40 is mounted. The tilting platform 46 is generally defined by a left side 62 and an opposed right side 64, and the right side 64 includes the access slot 60. As shown in FIGS. 1a and 1c, the portable electronic device 12 is understood to have longer vertical sides 18 than the horizontal sides 20. In order for the portable electronic device 12 not to extend beyond the boundaries of the tilting platform 46 when in the horizontal orientation, the rotation point of the device support platform 40, though centrally located, is not at the exact center. Since an inner edge 66 of the access slot 60 is generally coincident with the rotation point, it is understood that the access slot 60 is slightly offset toward the right side 64.

The tilting platform 46 also defines a recess 68 that defines the outline or boundary of the access slot 60. Engaged to the tilting platform 46 through the access slot 60 is a support receptacle 70, which extends into the hollow portion of the base stand unit 22. More particularly, the support receptacle 70 defines a peripheral lip 72 that is engaged to the recess 68. In this regard, the peripheral lip 72 has a thickness that is substantially equivalent to the depth of the recess 68 such that the flat top surface 56 of the tilting platform 46 is coplanar with the top of the peripheral lip 72. Furthermore, the support receptacle 70 is defined by an open rectangular top end 74 that has corresponds in shape and size to the access slot 60.

Figure 4A:
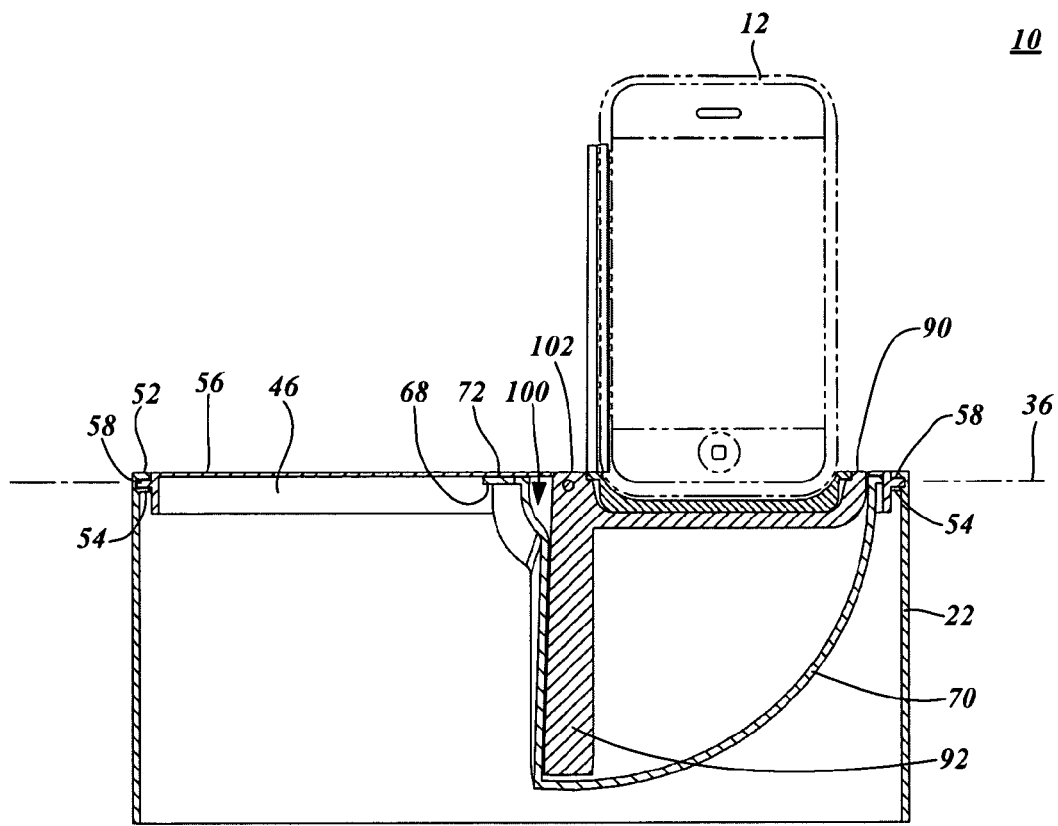
FIG. 4a is a front cross-sectional view of the docking system with the portable electronic device in the vertical orientation.
Figure 4B:
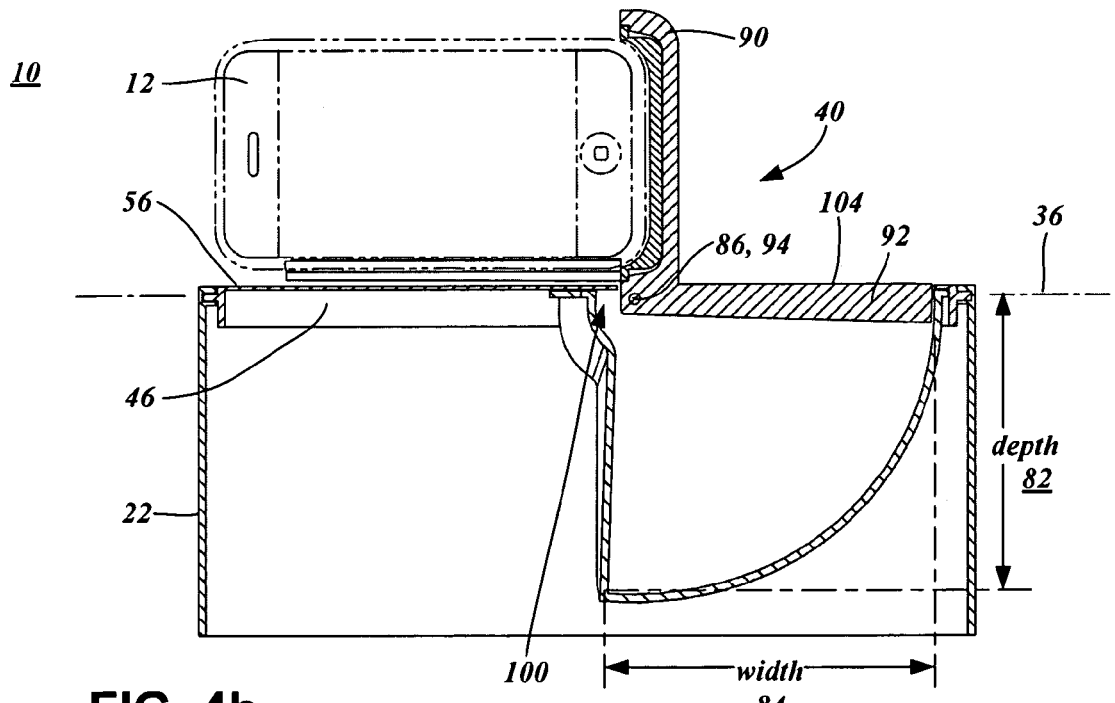
FIG. 4b is a front cross-sectional view of the docking system with the portable electronic device in the horizontal orientation.

In addition to the open rectangular top end 74, the support receptacle 70 is further defined by a vertical side 76, a rounded bottom segment 78, and a pair of opposed sidewalls 80 that have a profile corresponding to the vertical side 76 and the rounded bottom segment 78. As best illustrated in FIG. 4b, the support receptacle 70 is defined by a depth 82 and a width 84. For reasons that will become more apparent below upon consideration of the features of the device support platform 40, the depth 82 and the width 84 are substantially equivalent, and the rounded bottom segment 78 represents a sector of a circle having a center point 86.

As indicated above, the device support platform 40 is rotatably mounted to the base stand unit 22. More particularly, however, the device support platform 40 is mounted to the support receptacle 70, which in turn is mounted to the tilting platform 46. The tilting platform 46, in turn, is mounted to the base stand unit 22. Those having ordinary skill in the art will recognize that while the above description involve various component levels, any distinctions are for organizational clarity only and not intended to be limiting. For example, reference to the device support platform 40 being mounted to the tilting platform 46 is understood to describe the same relationship as the device support platform 40 being mounted to the base stand unit 22.

Referring again to the exploded perspective view of FIG. 3, the device support platform 40 is comprised of a rotating arm 88 and the cradle unit 42. These components and their relation to the docking system 10 will be explained in turn.

In further detail, the arm 88 is defined by a first arm segment 90 that is perpendicular to a second arm segment 92. At an intersect 94 of the first arm segment 90 and the second arm segment 92 is a set of cylindrical mounting pins 96 extending from both sides of the arm 88. Along these lines, the support receptacle 70, and particularly the opposed sidewalls 80, defines mounting holes 98 having a cylindrical outline. It is contemplated that the mounting holes 98 engage the mounting pins 96, such that the arm 88 pivots about the same. The longitudinal axis 38 shown in FIG. 1a, then, extends through the intersect 94, the mounting pins 96, and the mounting holes 98. The center point 86 of the support receptacle is thus coincident with the pivot point of the arm 88. As previously mentioned, the device support platform 40, and hence the arm 88, rotates between the first position shown in FIG. 4a, and the second position shown in FIG. 4b, corresponding to the vertical orientation and the horizontal orientation, respectively, of the portable electronic device 12 attached thereto. Thus, the support receptacle 70 receives the arm 88, and the arm 88 rotates therein. So as not to interfere with the rotational path, the support receptacle 70 defines a depression 100.

It is expressly contemplated that regardless of position, the arm 88 covers the open rectangular top end 74 of the support receptacle 70, and conceals the interior of the same. However, some embodiments are contemplated in which the second arm segment 92 is omitted, such that the interior of the support receptacle 70 is concealed only with the arm 88 in the first position. As best shown in FIGS. 1a and 4a, an exposed surface 102 of the first arm segment 90 is flush or co-planar with the flat top surface 56 of the tilting platform 46 when in the first position. FIGS. 1 and 4b show another exposed surface 104 of the second arm segment 92 as flush or co-planar with the flat top surface 56 of the tilting platform 46 when in the second position.

Relatedly, the vertical side 76 of the support receptacle 70 and the second arm segment 92 may not be exactly perpendicular to the open rectangular top end 74 and the first arm segment 90, respectively. In order to prevent the vertical side 76 from prematurely limiting the rotation path of the arm 88 before the first arm segment 90 becomes flush with the flat top surface 56 of the tilting platform 46, it may be angled slightly outwards to accommodate the increased displacement.

As previously noted, some embodiments of the present invention contemplate a particular sizing and configuration of the constituent components of the docking system 10 for specific reasons. The first arm segment 90 is understood to have the same outline and dimensions as the open rectangular top end 74, including the rounded corners and the like. Likewise, the second arm segment 92 is also understood to have the same outline and dimensions as the open rectangular top end 74. The depth 82, the width 8F4, and the radius of the rounded bottom segment 78 of the support receptacle 70 are the same because the length of the first arm segment 90 is constant throughout its rotational path between the first position and the second position, as does the length of the second arm segment 92.

With reference again to FIG. 3, the device support platform 40 includes the rotating arm 88 and the cradle unit 42. According to one contemplated embodiment, the first arm segment 90 defines a universal receiver or adapter 106. It is understood that the universal adapter 106, in the context of the illustrated embodiment, refers to a cavity having a particular shape and size. The cradle unit 42 has a bottom protrusion 108 that conforms to the shape and size of the universal adapter 106, that is, the protrusion 108 is universal. The bottom protrusion 108 of the cradle unit 42 is thus understood to mate with or otherwise securely couple to the universal adapter 106. Opposite the bottom protrusion 108 is device-specific receiver or adapter 110 that mates with the bottom end of the portable electronic device 12.

It is envisioned that the cradle unit 42 is interchangeable with others that have a differing device-specific adapter 110 to accommodate other types of portable electronic devices 12 having various thicknesses and cross-section shapes. The other cradle units 42 are understood to have the same universal bottom protrusion 108 to properly mate with the arm 88. However, some embodiments contemplate the cradle unit 42 being fixed to the arm 88.

As indicated above, the cradle unit 42 also includes a lateral support component 44 extending therefrom. According to one embodiment, the lateral support component 44 is generally defined by a U-shaped cross section that conforms to the edge contours of the portable electronic device 12. In many cases, the edge contour at the bottom is the same as the middle of the portable electronic device 12, so the cross section of the lateral support component 44 may be similarly sized and shaped as the device-specific adapter 110. It is contemplated that the lateral support component 44 extends a predefined length sufficient to support the portable electronic device 12. However, it is also understood that in the second position, the lateral support component 44 does not extend beyond the periphery of the base stand unit 12.

Figure 5A:
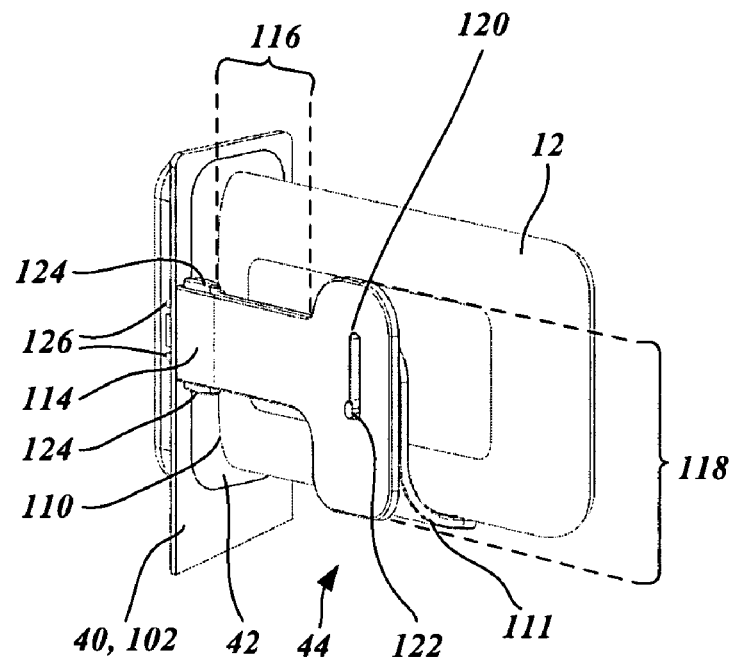
FIG. 5a is a rear perspective view of a second embodiment of a lateral support component incorporated into the docking system.
Figure 5B:
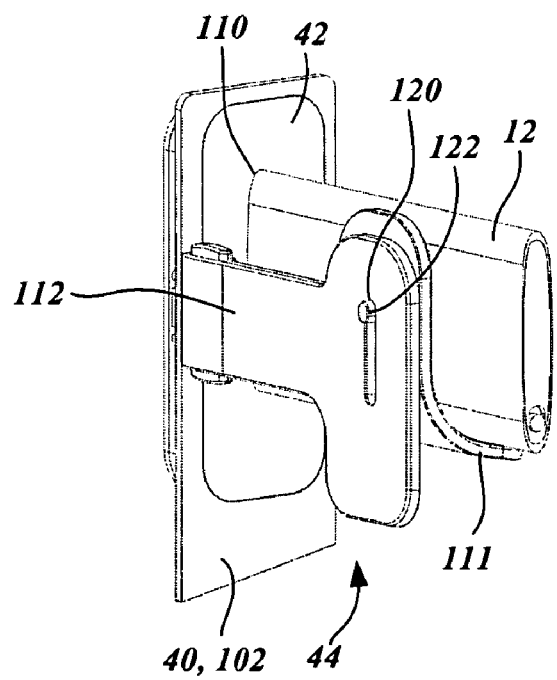
FIG. 5b is a rear perspective view of the second embodiment of the lateral support component.

Other configurations of the lateral support component 44 are envisioned for accommodating a variety of differently sized and shaped portable electronic devices 12. In this regard, the lateral support component 44 may be adjustable with respect to its length, as well as with respect to its position along the device-specific adapter 110. One of these alternative embodiments is shown in FIGS. 5a and 5b. Generally, the second embodiment of the lateral support component 44 is fixedly attached to the device support platform 40, and as indicated above, holds the portable electronic device 12 regardless of size or shape upon adjustment. The portable electronic device 12 shown in FIG. 5a is understood to have a wider footprint, and may be the iPhone from Apple, Inc. In contrast, the portable electronic device 12 shown in FIG. 5b is understood to be a device such as the iPod Nano, also from Apple, Inc., which has a narrower footprint. In this regard, it will be appreciated that the device-specific adapter 110 is correspondingly sized and shaped for receiving the portable electronic device 12.

The lateral support component 44 includes grip member 111 and a static arm 112. The grip member 111 supports the portable electronic device 12, and is slidably engaged to the static arm 112 to accommodate varying widths of the portable electronic device 12. The static arm 112 is generally defined by a trunk section 116 and a cross section 118 perpendicular thereto. The cross section 118 defines an elongate slot 120, to which the grip member 111 is engaged. In further detail, the grip member 111 includes a plug 122 that is inserted through and slides along the elongate slot 120. FIG. 5a illustrates the plug 122, and hence the grip member 111, at its lowermost position that result in the widest space relative to the mounting point of the static arm 112. Similarly, FIG. 5b illustrates the same at its uppermost position that results in the narrowest configuration relative to the mounting point of the static arm 112.

It is understood that the grip member 111 and the static arm 112 includes one of a numerous types of locking modalities that allow the grip member 111 to be secured along predetermined positions in relation to the static arm 112. Those having ordinary skill in the art will be able to ascertain such different locking modalities, and each such modality are deemed to be within the scope of the present invention.

As indicated above, the static arm 112 is removably mounted to the device support platform 40. More particularly, the static arm 112 includes an attachment base 114 having a pair of opposed push tabs 124 that are each coupled to extending and retracting lock protuberances 126 that are engageable to the device support platform 40. It will be understood that upon compressing the push tabs 124, the lock protuberances 126 are retracted, allowing the lateral support member 44 to be removed from the device support platform 40. With the push tabs 124 in its uncompressed or static state, the lock protuberances 126 are extended and further movement from the device support platform 40 is precluded. While a specific embodiment of the attachment modality has been set forth, those having ordinary skill in the art will appreciate that other selective locking systems may be readily substituted.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A portable device docking system, comprising:
an elongate base with a flat top end, a lateral axis and a longitudinal axis perpendicular thereto, the flat top end defining an access slot; and
a device support arm rotatably mounted to the elongate base along the longitudinal axis thereof and having a first position and a second position, the device support arm being defined by a first arm segment substantially concealing the access slot in the first position.

2. The portable device docking system of claim 1, wherein the elongate base is integrated with a primary unit.

3. The portable device docking system of claim 2, wherein the primary unit is selected from a group consisting of: a loudspeaker, a stereo receiver, and furniture.

4. The portable device docking system of claim 1, wherein:
the elongate base includes a tilting platform rotatably mounted along the lateral axis, the access slot being defined therein.

5. A portable device docking system, comprising:
an elongate base portion defined by an open top end with a lateral axis and a longitudinal axis perpendicular thereto;
a tilting platform rotatably mounted to the elongate base portion along the lateral axis thereof, the tilting platform defining an access slot; and
a device support arm rotatably mounted to the tilting platform along the longitudinal axis thereof and having a first position and a second position, the device support arm being defined by a first arm segment substantially concealing the access slot in the first position.

6. The portable device docking system of claim 5, wherein the device support arm is defined by a second arm segment substantially concealing the access slot in the second position.

7. The portable device docking system of claim 6, wherein the first arm segment is perpendicular to the second arm segment.

8. The portable device docking system of claim 5, further comprising:
a support receptacle mounted to the tilting platform through the access slot, the device support arm being mounted thereto.

9. The portable device docking system of claim 8, wherein the support receptacle is defined by an open rectangular top end, a vertical side, a rounded bottom segment, and a pair of opposed sidewalls having a profile corresponding to the vertical side and the rounded bottom segment.

10. The portable device docking system of claim 8, wherein the vertical side and the open rectangular top end have substantially identical dimensions.

11. The portable device docking system of claim 5, further comprising:
a device adapter having a frontal receiver, a rear protrusion and an extension arm;
wherein the device support arm defines a universal receptacle engageable to the rear protrusion of the device adapter.

12. The portable device docking system of claim 11, wherein the device adapter is fixable to the device support arm.

13. The portable device docking system of claim 11, wherein the device adapter is interchangeable with another device adapter having an alternative frontal receiver configuration and the identical rear protrusion configuration.

14. A docking system for supporting a portable electronic device having a vertical operational orientation and a horizontal operational orientation, comprising:
a base stand portion having a flat top surface;
a device support platform rotatably mounted to the base stand portion, the device support platform defining a cradle portion engageable to the portable electronic device, the device support platform having a first position corresponding to the vertical operational orientation and a second position corresponding to the horizontal operational orientation; and
a lateral support component extending from the device support platform.

15. The docking system of claim 14, wherein the base stand portion includes:
an elongate stand defining an open top end; and
a tilting platform rotatably mounted to the elongate stand along a first axis thereof, the device support platform and the portable electronic device engaged thereto being rotatable along the first axis to adjust the viewing angle.

16. The docking system of claim 15, wherein the tilting platform defines an access port through which the device support platform is mounted, the device support platform being rotatable along a second axis perpendicular to the first axis.

17. The docking system of claim 16, wherein:
the device support platform defines a cover portion; and
the cradle portion covers the access port with the device support platform in the first position and the cover portion covers the access port with the device support platform in the second position.

18. The docking system of claim 14, wherein the base stand portion is a part of a stereo receiver unit.

19. The docking system of claim 14 wherein the base stand portion is part of a loudspeaker box.

20. The docking system of claim 14, wherein the portable electronic device rests against the lateral support component with the device support platform in the second position.

21. The docking system of claim 14, wherein the device support platform includes:
a universal adapter; and
an interchangeable device adapter coupled to the universal adapter, the device adapter including the cradle portion.

22. The portable device docking system of claim 14, further comprising a support receptacle defined by an open rectangular top end, a vertical side, a rounded bottom segment, and a pair of opposed sidewalls having a profile corresponding to the vertical side and the rounded bottom segment, the support receptacle being mounted into the base stand unit and receiving the device support platform.

23. A docking system, comprising:
a base housing compartment defined by an open top portion;
a tilt panel rotatably mounted to the open top end of the base housing compartment along a first axis thereof, tilt panel defining a first side section and an opposed second side section, the first side section defining an access slot;
an arm receiver cup mounted to the tilt panel and extending into the base housing compartment, the arm receiver cup having an open rectangular top defined by opposed long edges, opposed short edges, and a lip engageable to the access slot of the tilt panel;
a dock arm rotatably mounted to the arm receiver cup, the dock arm including a first panel defining a universal recess and a second panel perpendicular thereto, the panels each having dimensions substantially equivalent to the open rectangular top of the arm receiver cup; and
an interchangeable device support defined by a universal bottom side and a device-specific top side, the universal bottom side being removably coupled to the universal recess of the dock arm.

24. The docking system of claim 23, wherein the arm mounting cup is defined by a depth, a width, and a length, the depth dimension being substantially equal to the length dimension.

25. The docking system of claim 23, wherein the arm mounting cup is defined by a vertical side section perpendicular to the open rectangular top at a one of the short edges, an arcuate section extending between the vertical side section and a other one of the short edges of the open rectangular top, and opposed circular sector sections having a perimeter defined by the long edges of the open rectangular top, the vertical side section, and the arcuate section.

26. The docking system of claim 25, wherein the arm mounting cup defines a center point, the radial center of the arcuate section and the dock arm mounting point being coincident therewith.

27. The docking system of claim 23, wherein the device support includes a brace extending therefrom.

* * * * *